United States Patent [19]

Hidaka

[11] 4,238,010
[45] Dec. 9, 1980

[54] CURRENT TRANSMITTING SYSTEM FOR TRACKWAY TYPE MOTOR VEHICLE

[75] Inventor: Yoshiaki Hidaka, Yokohama, Japan

[73] Assignee: Nissan Motor Company, Limited, Japan

[21] Appl. No.: 12,807

[22] Filed: Feb. 16, 1979

[30] Foreign Application Priority Data

Feb. 20, 1978 [JP] Japan .............................. 53-19586[U]

[51] Int. Cl.³ .............................................. B60M 1/04
[52] U.S. Cl. ...................................................... 191/31
[58] Field of Search .................. 191/22 R, 25, 30, 31, 191/49

[56] References Cited

U.S. PATENT DOCUMENTS

| | | | |
|---|---|---|---|
| 508,083 | 11/1893 | Brain | 191/25 |
| 2,316,064 | 4/1943 | Hans | 191/25 |

Primary Examiner—Richard A. Schacher

Attorney, Agent, or Firm—Lane, Aitken, Ziems, Kice & Kananen

[57] ABSTRACT

A bus bar unit on which a current collecting unit rides comprises a body having therein a groove and thereon a hinged lid portion which closes the groove when pressed against the body proper, and a current carrying naked cable received in the groove. The current collecting unit comprises a shoe, a horizontal roller for continuously opening the lid portion to allow the shoe to be in sliding contact with the naked cable when moved in a direction, and a vertical roller for pressing the opened lid portion against the body proper to close the groove when moved in the direction. The shoe has a tapered section having an inclined side upon which a back surface of the lid portion bears to cause raising of the lid portion from the body proper when the shoe moves in the direction under a state in which the lid portion is disengaged from the horizontal roller.

3 Claims, 7 Drawing Figures

CURRENT TRANSMITTING SYSTEM FOR TRACKWAY TYPE MOTOR VEHICLE

FIELD OF THE INVENTION

The present invention relates in general to a transportation system which comprises a self-propelled vehicle and a guiding trackway along which the vehicle runs by collecting current from current carrying cables or bus bars extending along the trackway, and more particularly to a current transmitting system of the above-mentioned transportation system for continuously transmitting current from the bus bars to an electric drive motor mounted in the vehicle.

OBJECTS OF THE INVENTION

It is an object of the present invention to provide a current transmitting system which assures a continuous and reliable electric connection between a bus bar mounted in a bus bar unit and an electric drive motor equipped in a vehicle.

It is another object of the present invention to provide a current collecting unit which is constructed to assure the continuous electric connection between the bus bars and the shoes of the current collecting unit even when the unit is subjected to run on discontinuously lined bus bar units.

SUMMARY OF THE DRAWINGS

Other objects and advantages of the present invention will become clear from the following description when taken in conjunction with the accompanying drawings, in which.

DESCRIPTION OF A TRANSPORTATION SYSTEM WHICH HAS BEEN PROPOSED

Prior to describing in detail the construction of a current transmitting system according to the invention, an outlined explanation of the transportation system to which the current transmitting system of the invention is adaptable will be made with reference to FIGS. 1, 2A and 2B in order to clarify the invention.

Figure 1:
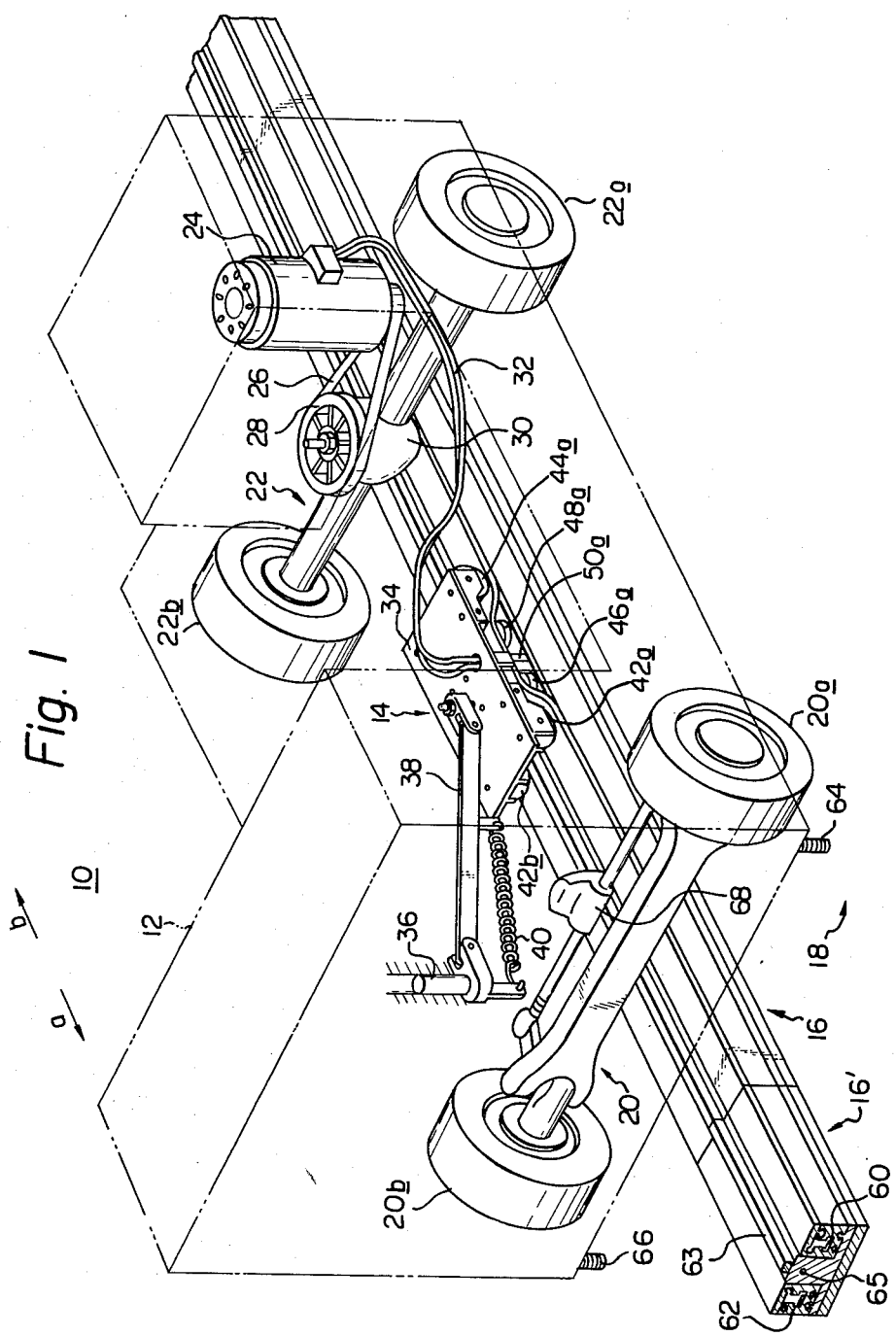
FIG. 1 is a sketch of a self-propelled vehicle having a current collecting unit riding on a bus bar unit, the current collecting unit being of an example and thus replaceable with one according to the invention.
Figure 2A:
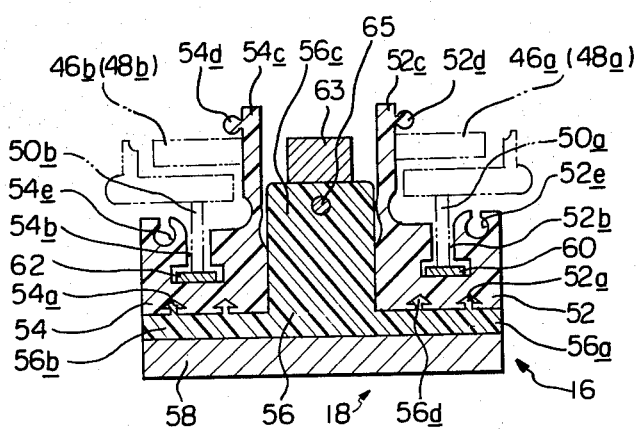
FIG. 2A is a sectional view of the bus bar unit of FIG. 1, depicting a condition in which lid portions are open by a part of the current collecting unit.
Figure 2B:
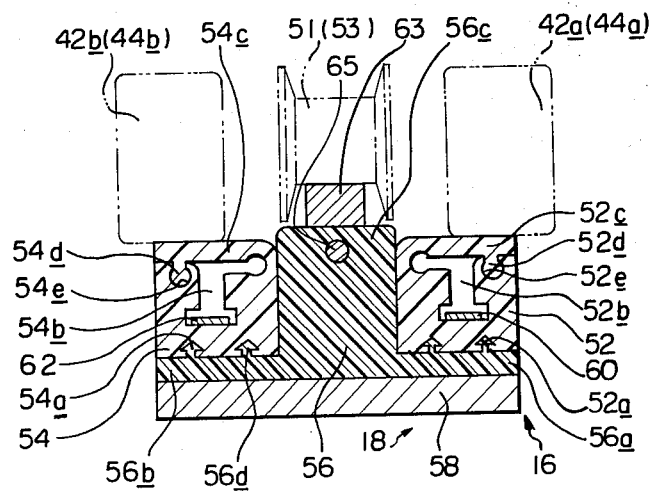
FIG. 2B is a view similar to FIG. 2A, but depicts a condition in which lid portions close grooves of containers by a part of the current collecting unit.

In FIGS. 1 to 2B, especially in FIG. 1, there is illustrated a transportation system 10 which has been proposed. The system 10 generally comprises a self-propelled vehicle 12, a current collecting unit 14 universally jointed to the vehicle 12, a bus bar unit 16 above which the vehicle 12 runs by sliding the current collecting unit 14 on the bus bar unit 16, and an automatic vehicle guiding unit (no numeral) for automatically steering the vehicle 12, the bus bar unit 16 being laid on a trackway 18 along which the vehicle 12 runs.

The vehicle 12 has front and rear wheel units 20 and 22 each having road wheels 20a and 20b or 22a and 22b which ride or run on the trackway 18 for carrying the body of the vehicle 12. An electric motor 24 is arranged in the vicinity of the rear wheel unit 22 and drives, when electrically energized, the rear road wheels 22a and 22b via a belt 26, a pulley 28 and a known differential gear 30, as shown. Designated by numeral 32 are connecting cables which connect the electric motor 24 with the current collecting unit 14.

The current collecting unit 14 comprises a base plate 34 which is connected to the body of the vehicle 12 through a universally jointed link mechanism which includes a pin 36 slidably disposed in a hole (no numeral) formed in the vehicle, and a link bar 38 connecting the pin 36 with the base plate 34. A spring 40 is spanned between the pin 36 and a lug portion (no numeral) of the link bar 38 for urgingly pressing the current collecting unit 14 against the bus bar unit 16. Two groups of parts are mounted on the back of the base plate 34 so as to be substantially symmetric with respect to the longitudinal axis of the base plate 34. Each group consists of spaced front and rear vertical rollers 42a and 44a (or 42b and 44b) which are adapted to roll on an upper surface of a later-mentioned lid portion 52c (or 54c) of a bus bar container 52 (or 54), front and rear horizontal rollers 46a and 48a (or 46b and 48b) which are arranged between the front and rear vertical rollers and adapted to roll on a back surface of the lid portion 52c (or 54c, and a current collecting shoe 50a (or 50b) which is arranged between the front and rear horizontal rollers and adapted to slide on a later-mentioned naked bus bar 60 (or 62) received in the bus bar container 52 (or 54). The current collecting shoes 50a and 50b are respectively connected to the aforementioned cables 32. Although not shown in FIG. 1, front and rear guide rollers 51, 53 each having spaced flanges are rotatably mounted on back surfaces of the base plate 34.

As is well shown in FIGS. 2A and 2B, the bus bar unit 16 comprises a pair of bus bar containers 52 and 54 which are constructed of a flexible insulating material such as a flexible polyvinyl chloride (PVC). The containers 52 and 54 are secured to respective flange sections 56a and 56b of a stand member 56 which is constructed of a rigid insulating material such as a rigid polyvinyl chloride (PVC). As shown, the containers 52 and 54 on the flanges 56a and 56b are arranged substantially symmetrically with respect to a central ridge portion 56c of the stand member 56. The connection of the containers 52 and 54 to the flange sections 56a and 56b is made by latchably embedding longitudinally extending projections 56d (only one is numbered) formed on the flange sections 56a and 56b into corresponding longitudinally extending grooves 52a and 54a formed in the containers 52 and 54, in a snap action manner. For this, each projection and each groove have respective enlarged sections, as shown. The stand member 56 is attached via a height adjusting plate 58 to the trackway 18 by a suitable known technique. The height adjusting plate 58 is made of a flexible material such as a rubber plate.

Each of the cotainers 52 and 54 has a longitudinally extending groove 52b or 54b within which a naked bus bar or current carrying naked cable 60 or 62 is fixedly disposed to extend along the corresponding groove. Each container 52 or 54 has a longitudinally extending lid portion 52c or 54c which is hinged at its one lateral end to the body of the container 52 or 54. As shown, each lid portion 52c or 54c has a sufficient width to cover the corresponding groove 52b or 54b and has at the laterally leading end portion thereof a longitudinally extending ridge 52d or 54d which has an enlarged $\Omega$-shaped head in cross-section. The ridge 52d or 54d is latchably received in longitudinally extending groove 52e or 54e formed in the main portion of the container 52 or 54 when the lid portion 52c or 54c is pressed against the body portion. For assurance of latching, each groove 52e or 54e is formed at the bottom thereof with an enlarged $\Omega$-shaped section, as shown. A guide rail 63 having a generally rectangular cross section is mounted on and secured to the top of the central ridge portion 56c of the stand member 56 to extend along the same. Upon mounting of the current collecting unit 14 on the bus bar unit 16, the afore-mentioned guide rollers 51 and 53 are set on the guide rail 63 as is shown in FIG. 2B.

Designated by numeral 65 is an induction cable which is embedded in the central ridge portion 56c of the stand member 56 and constitutes part of the automatic vehicle guiding unit. As is shown in FIG. 1, the automatic vehicle guiding unit comprises sensing coils 64 and 66 fixed to the body of the vehicle 12, a control unit (not shown) and a steering mechanism 68 operatively connected to the front wheel unit 20 of the vehicle 12. Upon travelling of the vehicle 12 along the trackway 18, the sensing coils 64 and 66 continuously sense the alternating magnetic field produced by the induction cable 65 to control the steering mechanism 68 by the aid of the control unit so as to allow the vehicle 12 to take the predetermined cruising way.

In setting or mounting the current collecting unit 14 on the bus bar unit 16, the lid portions 52c and 54c are partially opened by an operator's hand or hands to receive the current collecting shoes 50a and 50b into the corresponding grooves 52b and 54b. In this instance, the horizontal rollers 46a, 48a, 46b and 48b take positions to hold the corresponding lid portions 52c and 54c open by contacting at the cylindrical surfaces thereof with the back surfaces of the lid portions 52c and 54c, as is well shown in FIG. 2A. Further, the vertical rollers 42a, 44a, 42b and 44b take positions to press the corresponding lid portions 52c and 54c against the containers 52 and 54 proper to accomplish latching engagement between the lid portions and the containers as shown in FIG. 2B. Upon proper setting of the unit 14 on the bus bar unit 16, the current collecting shoes 50a and 50b are in sliding contact with the naked bus bars 60 and 62 to provide an electric connection between the bus bars and the electric motor 24 in the vehicle 12.

While the vehicle 12 runs along the bus bar unit 16 with the current collecting unit 14 in the direction of "a" in FIG. 1, the horizontal rollers 46a and 46b act to open the lid portions 52c and 54c of the containers 52 and 54 and the vertical rollers 44a and 44b act to close the opened lid portions 52c and 54c. On the other hand, when the vehicle 12 runs in the direction of "b" in FIG. 1, the horizontal rollers 48a and 48b act to open the lid portions 52c and 54c and the vertical rollers 42a and 42b act to close the opened lid portion. Thus, it will be appreciated that the bus bar receiving grooves 52b and 54b are kept closed for except small portions where the current collecting unit 14 is just located. In other words, the bus bar receiving grooves are usually closed by the corresponding lid portions 52c and 54c. Thus, the bus bars 60 and 62 which are naked are prevented from being exposed to rain and/or contaminated with mud thereby being protected from rust.

In the above-mentioned transportation system, however, a problem is encountered when the current collecting unit 14 is subjected to run on discontinuously lined bus bar units. Assuming that the current collecting unit 14 running for example in the direction of "a" in FIG. 1 reaches to the next-positioned bus bar unit 16', the horizontal rollers 46a and 46b which have continued to raise the lid portions 52c and 54c to open the same come out suddenly and ride on the lid portions (no numeral) of the next bus bar unit 16'. Thus, the lid portions of the unit 16' are not opened any more so that the shoes 50a and 50b fail to transmit current from the bus bars 60 and 62 to the motor 24. Although such problem may be solved by integrating the lid portions of the units 16 and 16' by means of suitable techniques such as bonding or welding, installation cost of the bus bar units is increased. Furthermore, switches can not be arranged in the way of the bus bar units.

DESCRIPTION OF THE EMBODIMENT

The present invention contemplates to eliminate the above-mentioned drawbacks.

Referring to FIGS. 3 to 5B, there is illustrated a current collecting unit 70 of the current transmitting system of the invention, the unit 70 being shown to mount on the aforementioned bus bar unit 16.

Figure 4:
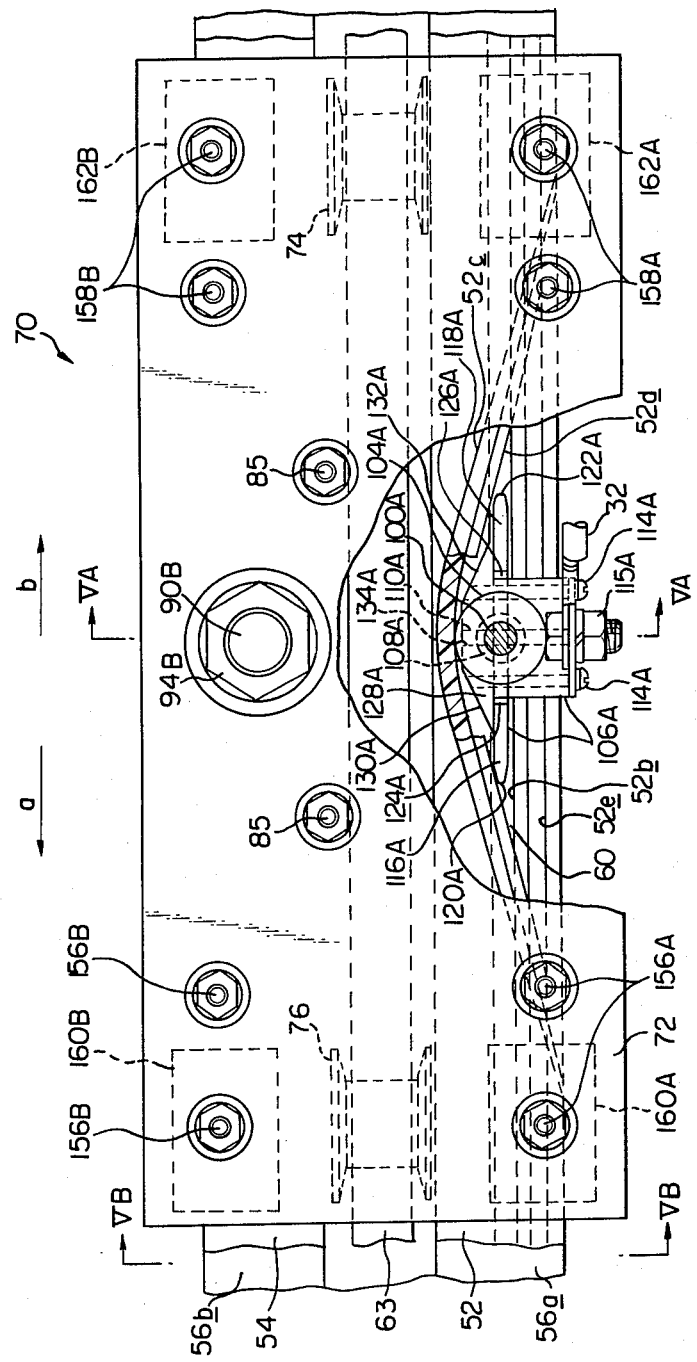
FIG. 4 is a partially broken plan view of the current collecting unit of FIG. 3.

The current collecting unit 70 of the invention comprises a base plate 72 constructed of an insulating rigid material such as phenol resin plate. As is best shown in FIG. 4, the base plate 72 is equipped at its longitudinal both ends with respective guide rollers 74 and 76 each having spaced flanges (no numerals). Each guide roller is rotatably supported by a bracket 78 or 80 via a pin 82 or 84 as is seen from FIG. 5B. Upon mounting of the current collecting unit 70 on the bus bar unit 16, the guide rollers 74 and 76 are set on the guide rail 63 for guiding the current collecting unit 70. An opening 72a (see FIG. 5A) is formed in the middle portion of the base plate 72 for receiving therein a rod 86. The rod 86 is axially rotatably supported at its downwardly leading end by a bracket 88 which is secured to the back of the base plate 72 by bolts and nuts 85. The other end of the rod 86 is connected via the aforementioned universally jointed link mechanism (see FIG. 1) to the body of the vehicle 12. Of course, a spring 40 for urging the current collecting unit 70 toward the bus bar unit 16 is used.

Two groups of next-mentioned parts are arranged on the base plate 72 so as to be substantially symmetric with respect to an imaginary plane which passes through the middle portions of the guide rollers 74 and 76. The parts of one group are substantially the same in construction and configuration as those in the other group. Thus, for facilitation of the description, the following explanation of the current collecting unit 70 will be made with respect to the parts of the one group which is located in a right section of the current collecting unit 70 with respect to the direction of "b" in FIG.

3 or 4. But, for ease of understanding and description, the parts located in the right section will be indicated by the addition of the reference "A" after each numeral while those in the left section will be indicated by the addition of "B" after each corresponding numeral.

Figure 5A:
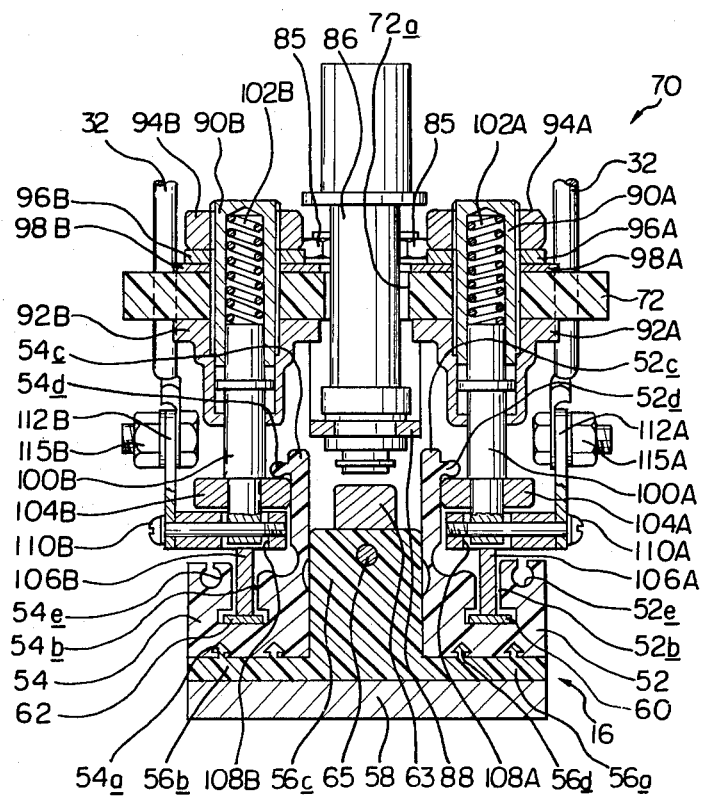
FIG. 5A is a sectional view taken along the line VA—VA of FIG. 4.

As is best shown in FIG. 5A, an exteriorly threaded sleeve 90A is penetrated into the base plate 72 in the vicinity of the before-mentioned central opening 72a. A tubular rod guide 92A and a nut 94A are coupled with the sleeve 94B so as to sandwich therebetween the base plate 72 via washers 96A and 98A thereby fixing the sleeve 90A to the base plate 72. The rod guide 92A receives therein a generally half of a shoe supporting rod 100A allowing the upper end section of the rod 100A to be slidably inserted in the sleeve 90A. The rod 100A is biased to move downwardly in the drawing by a spring 102A disposed in the sleeve 90A and has at its lower section a horizontal roller 104A which is rotatable about the axis of the rod 100A. As will become clear from the following, the horizontal roller 104A functions to keep the lid portion 52c (or 54c) of the bus bar container 52 (or 54) open.

Figure 3:
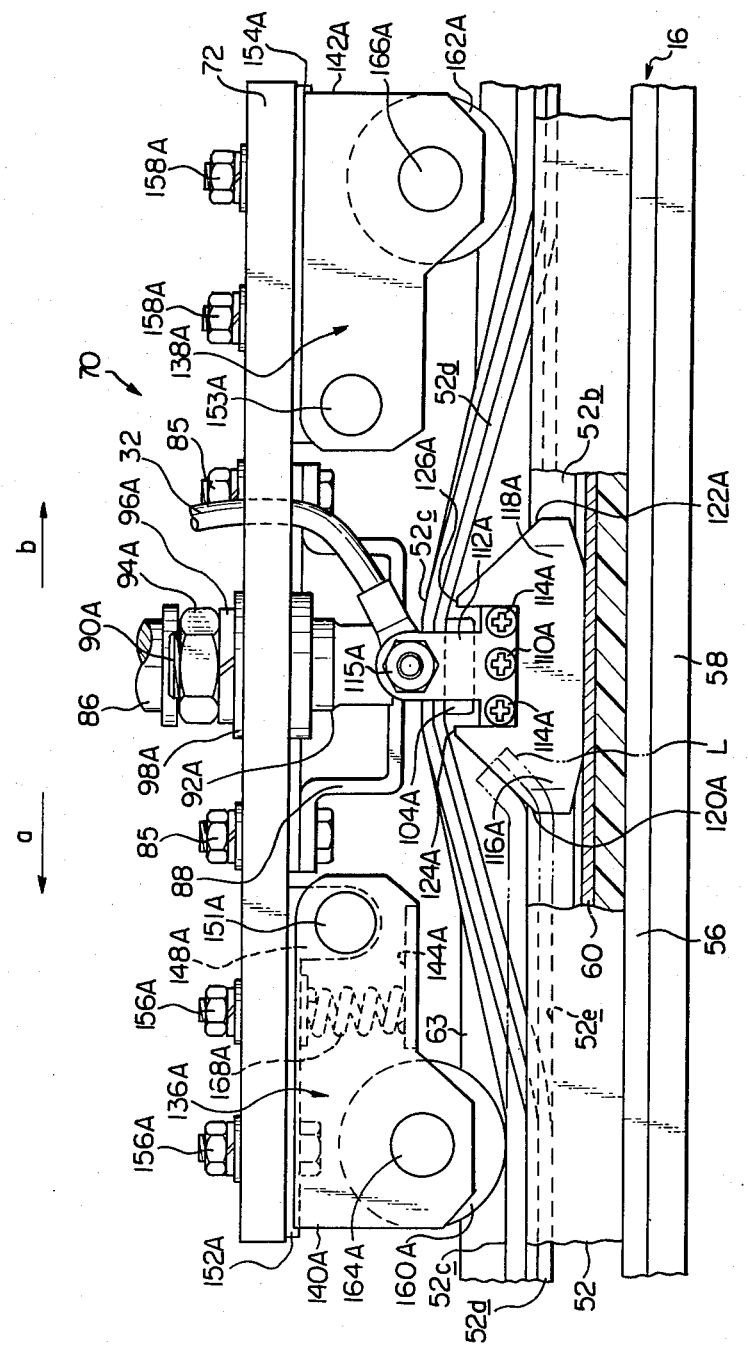
FIG. 3 is a partially broken side view of a current collecting unit of a transportation system according to the invention.
Figure 6:
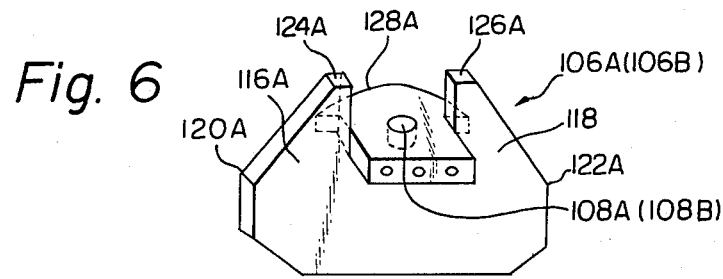
FIG. 6 is a perspective view of a current collecting shoe equipped in the current collecting unit according to the invention.
Figure 7A:
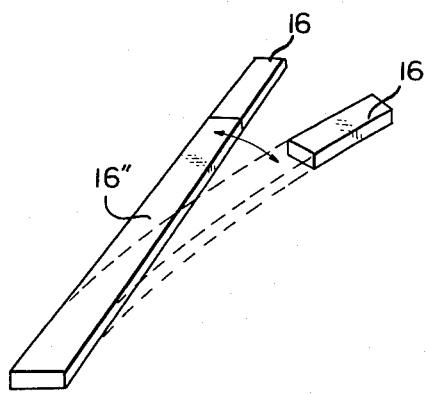
FIGS. 7A to 7D are sketches of switches usable in the way of the bus bar units on which the current collecting unit according to the invention runs.
Figure 7B:
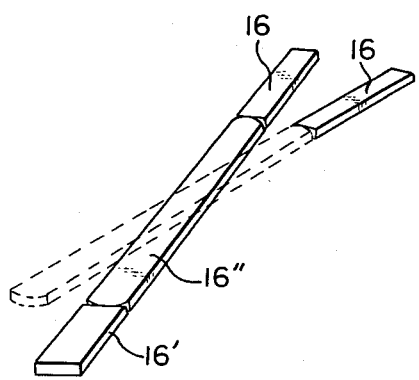
Figure 7C:
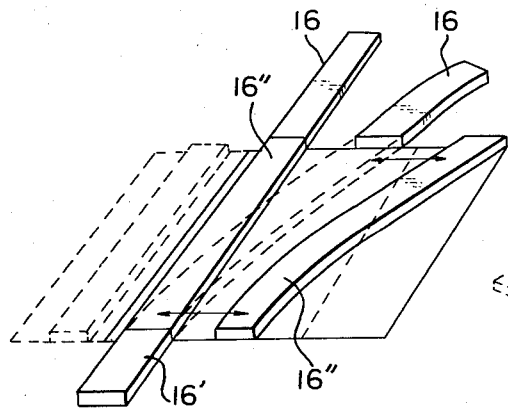
Figure 7D:
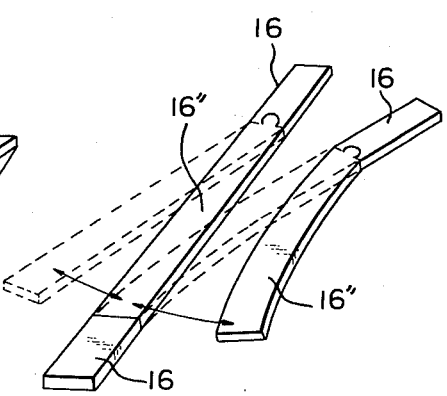

Connected to the downwardly leading end of the rod 100A is a current collecting shoe 106A the configuration of which is well shown in FIG. 6. As is seen in FIG. 5A, the leading end of the rod 100A is loosely disposed in a hole 108A formed in the shoe 106A and a pin 110A spanning the hole 108A passes through the leading end of the rod 100A to achieve connection between the rod 100A and the shoe 106A. A terminal plate 112A is secured to the shoe 106A by two bolts 114A between which the pin 110A is positioned as is seen in FIG. 3. Connected to the terminal plate 112A via a bolt and a nut 115A is a connecting cable 32 which leads to the electric drive motor (24) mounted in the vehicle (12).

As is understood from FIG. 3 or 6, the shoe 106A is constructed to have front and rear tapered sections 116A and 118A which terminate at points 120A and 122A respectively. Now, it should be noted that, upon setting of the shoe 106A on the naked bus bar 60 or 62 in the container 52 or 54, the terminating point 120A or 122A is located below the back surface of the lid portion 52c or 54c, in closed position, of the bus bar container 52 or 54. The tapered sections 116A and 118A have respective inclined upper sides (no numerals) which lead to tops 124A and 126A thereof which are located considerably below the upper surface of the horizontal roller 104A as is apparent from FIG. 3. This is made for preventing the lid portion 52c from being in contact with the inclined upper sides of the tapered sections 116A and 118A of the shoe 106A once opening of the lid portion by the horizontal roller 104A is accomplished. With this, undesirable abrasion of the lid portion does not occur.

Furthermore, as is seen from FIG. 4, the shoe 106A has at its left section (with respect to the direction "b") another tapered section 128A pointing toward the center of the base plate 72. The tapered section 128A has front and rear inclined sides 130A and 132A which terminate at tops thereof to form a flat top side 134A. It should be noted that the top side 134A is located inboard of the outermost cylindrical surface of the horizontal roller 104A so that the lid portion 52c is prevented from being in contact with the inclined sides 130A and 132A of the tapered section 128A once the horizontal roller 104A holds the lid portion 52c open.

Two opposing press-roller units 136A and 138A are connected to respective longitudinal end portions of the base plate 72 in such a manner as to be swingable toward the current collecting shoe 106A. As is seen from FIGS. 3 and 5B, each of the press roller units 136A and 138A comprises a roller holder 140A or 142A including two opposing side plates (no numerals) and a cross plate 144A (or 146A) connecting the side plates. The holder 140A or 142A is pivotally connected, via a pin 151A or 153A, at the inboard ends of the side plates thereof to spaced raised portions 148A (or 150A) of a plate 152A or 154A, the plate 152A or 154A being secured to the base plate 72 by bolts and nuts 156A or 158A. A vertical roller 160A or 162A is rotatably supported by the holder 140A or 142A via a pin 164A or 166A. The vertical roller 160A or 162A is biased to bear upon the upper surface of the lid portion 52c or 54c by a spring 168A (or 170A) which is spanned between the cross plate 144A (or 146A) and the holder supporting plate 152A or 154A.

Figure 5B:
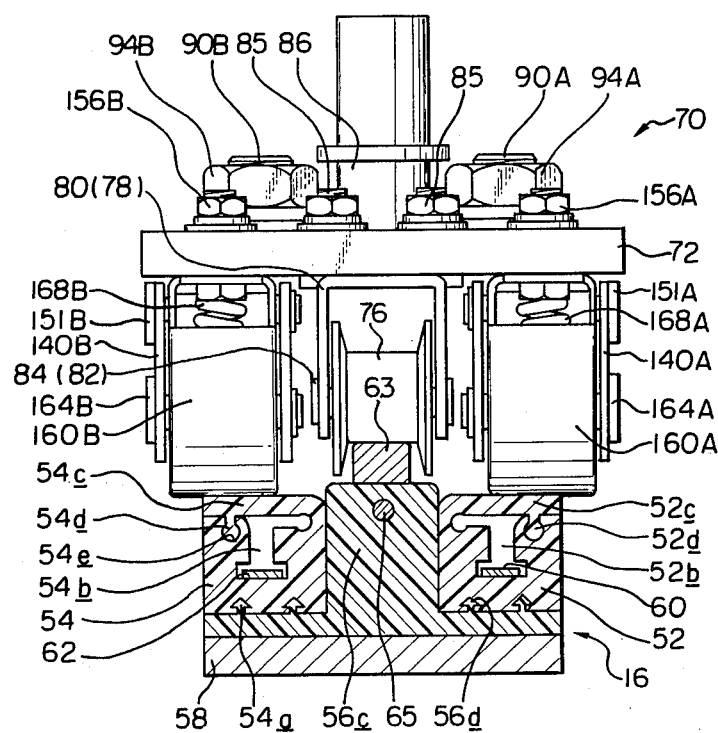
FIG. 5B is a sectional view taken along the line VB—VB of FIG. 4.

In setting or mounting the current collecting unit 70 on the bus bar unit 16, the horizontal rollers 104A and 104B take positions to hold the lid portions open to receive the shoes 106A and 106B into the grooves 52b and 54b by contacting at the cylindrical surfaces with the back surfaces of the lid portion in a manner as is shown in FIG. 5A and the press roller units 136A, 138A and 136B, 138B take positions, as is shown in FIG. 5B, to press the corresponding lid portions 52c and 54c against the containers 52 and 54 to accomplish the latching engagement between the lid portions and the containers. Upon proper setting or mounting of the current collecting unit 70 on the bus bar unit 16, the current collecting shoes 106A and 106B are in sliding contact with the naked bus bars 60 and 62 to provide electric connection between the bus bars and the electric motor (24) mounted in the vehicle (12)

While the current collecting unit 70 runs with the vehicle (12) along a bus bar unit 16 (which has a breakless lid portion on each side thereof) in either direction "a" or "b", the horizontal rollers 104A and 104B continuously open the lid portions 52c and 54c and the vertical press rollers 160A and 160B or 162A and 162B continuously close the opened lid portions, keeping the sliding contact between the current collecting shoes 106A and 106B and the naked bus bars 60 and 62. As has been mentioned, the continuously occurring opening of the lid portions by the horizontal rollers 104A and 104B is made without touching of the lid portions to the current collecting shoes.

When the current collecting unit 70 running for example in the direction of "a" in FIG. 3 reaches to the next-located bus bar unit 16', the front tapered sections 116A and 116B of the shoes 106A and 106B get into the side openings (no numerals) of the bus bar receiving grooves of the unit 16', disengaging the ridges 52d' and 54d' ("," after each numeral indicates a part of the unit 10') of the lid portions 52c' and 54c' from the grooves 52e' and 54e' of the containers 52' and 54' to allow sliding of the lid portion ends on the inclined upper sides of the front tapered sections 116A and 116B of the shoes 106A and 106B in a manner as is indicated by phantom lines L. When the shoes 106A and 106B are advanced, the lid portion ends come to the laterally extending tapered sections 128A and 128B of the shoes 106A and 106B (see FIG. 4) to be vertically raised and the lid portion ends are then brought into contact with the cylindrical sides of the horizontal rollers 104A and 104B to be kept completely open. When the shoes are further advanced, the lid portion ends having just passed over the horizontal rollers 104A and 104B are directed downwardly by their physical nature and then pressed, by the vertical press rollers 162A and 162B, against the bodies of the container 52 and 54 to achieve the latching engagements between the lid portions and the containers. After this, the lid portions 52c and 54c are opened by only the horizontal rollers 104A and 104B in a manner as has been stated before. The sliding contacts of the shoes 106A and 106B with the naked bus bars 60 and 62 are thus maintained.

With the above, it will be appreciated that the current collecting unit 70 according to the invention provides continuous electric connection between the bus bars 60 and 62 and the electric motor mounted in the vehicle even when it is subjected to run on a way consisting of discontinuous bus bar units such as 16 and 16' in FIG. 1. Thus, it is not necessary to integrate the facing lid portion ends of the separated bus bar units 16 and 16' thereby required decreased installation cost of the units. It should be noted that the current collecting unit 70 can be set to the bus bar unit 16 from side openings of the bus bar unit by slidingly inserting the tapered sections 116A and 116B (or 118A and 118B) of the shoes 106A and 106B into the grooves 52b and 54b of the containers 52 and 54. Thus, the troublesome hand work for partially opening the lid portions which has required in the system of FIG. 1 is not necessary. Furthermore, switches can be arranged in the way of the bus bar units.

FIGS. 7A to 7D show respectively constructions of switches usuable in the way of the bus bar units on which the current collecting unit 70 of the invention runs. In these drawings, movable bus bar unit (or units) is designated by numeral 16" and is movable between a position shown by solid lines and another position shown by broken lines. With using such switches, a large-scale transportation system can be provided.

What is claimed is:

1. A current transmitting system having a bus bar unit and a current collecting unit which rides on said bus bar unit to run along the same for transmitting current carried by said bus bar unit to an electric device mounted in a self-propelled vehicle, said bus bar unit comprising a body having therein a groove and thereon a hinged lid portion which sealingly closes said groove when pressed against the body proper, and a current carrying naked cable fixedly received in said groove; said current collecting unit comprising a current collecting shoe, a horizontal roller engaging at the cylindrical surface thereof with a back surface of said lid portion for continuously opening said lid portion to allow said shoe to be in sliding contact with said naked cable when moved in a direction, and a vertical roller for pressing at the cylindrical surface thereof the opened lid portion against the body proper to close said groove with said lid portion when moved in the direction, which is characterized in that said shoe has a tapered end at a section thereof which becomes a front of said shoe when said shoe moves in the direction, said tapered end pointing in said the direction and having an inclined side upon which said back surface of said lid portion bears to cause raising of the lid portion from the body proper when said shoe moves in the direction under a state in which said lid portion is disengaged from said horizontal roller.

2. A current transmitting system as claimed in claim 1, further characterized in that said shoe has a tapered section which points in a direction perpendicular to said the direction and has an inclined side upon which said back surface of the lid portion which has been raised by the inclined side of said tapered end bears to completely open said lid portion thereby permitting the opened lid portion to be brought into engagement with said horizontal roller.

3. A current transmitting system as claimed in claim 2, further characterized in that a top section of said inclined side of said tapered end is located below said horizontal roller and a leading end of said tapered section is located inboard of the outer most cylindrical periphery of said horizontal roller.

* * * * *